(12) United States Patent
Honda et al.

(10) Patent No.: US 7,362,877 B2
(45) Date of Patent: Apr. 22, 2008

(54) ELECTRIC ACOUSTIC CONVERTER AND ELECTRONIC DEVICE USING THE SAME

(75) Inventors: Kazuki Honda, Mie (JP); Koji Sano, Mie (JP); Kazutaka Kubo, Mie (JP); Kazuya Yamasaki, Osaka (JP); Hiroshi Yano, Mie (JP); Takeshi Shimokawatoko, Mie (JP); Takanori Fukuyama, Mie (JP); Shigeru Tomoeda, Mie (JP); Mitsutaka Enomoto, Nara (JP); Masahide Sumiyama, Mie (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/578,790

(22) PCT Filed: Apr. 27, 2005

(86) PCT No.: PCT/JP2005/008448

§ 371 (c)(1),
(2), (4) Date: May 9, 2006

(87) PCT Pub. No.: WO2005/107317

PCT Pub. Date: Nov. 10, 2005

(65) Prior Publication Data

US 2007/0080412 A1  Apr. 12, 2007

(30) Foreign Application Priority Data

Apr. 28, 2004  (JP)  ............................. 2004-133117

(51) Int. Cl.
*H04R 25/00* (2006.01)

(52) U.S. Cl. ...................................... 381/409; 381/410
(58) Field of Classification Search ................ 381/396, 381/409, 410, 412, 152, 431, 386, 394; 379/433.02, 379/433.05, 438
See application file for complete search history.

(56) References Cited

U.S. PATENT DOCUMENTS 6,674,872 B2* 1/2004 Fujinami et al. ............ 381/409
7,200,241 B2* 4/2007 Fukuyama et al. ......... 381/407

FOREIGN PATENT DOCUMENTS

| JP | 07-016494 | 3/1995 |
| JP | 2003-037890 A | 2/2003 |
| WO | WO 2005/107316 A1 | 11/2005 |
| WO | WO 2005/115047 A1 | 12/2005 |
| WO | WO 2006/003821 | 1/2006 |

OTHER PUBLICATIONS

International Search Report for PCT/JP2005/008448, dated Aug. 23, 2005.

* cited by examiner

*Primary Examiner*—Huyen Le
(74) *Attorney, Agent, or Firm*—RatnerPrestia

(57) ABSTRACT

An electro-acoustic transducer wherein a stopper of a terminal is composed of an elastic body having an impulsive-force resistance and an excellent resilience. The stopper is mounted on the yoke or lower plate of magnetic circuit, which is made of a metallic material having an impulsive-force resistance. In this way, the stopper can restrict the terminal within the reversibility limit value of the spring force of the metallic material, and hence can enhance the reliability.

8 Claims, 10 Drawing Sheets

US 7,362,877 B2

ELECTRIC ACOUSTIC CONVERTER AND ELECTRONIC DEVICE USING THE SAME

THIS APPLICATION IS A U.S. NATIONAL PHASE APPLICATION OF PCT INTERNATIONAL APPLICATION PCT/JP2005/008448.

TECHNICAL FIELD

The present invention relates to an electro-acoustic transducer used in various kinds of audio equipment or information communication device. The invention relates also to a portable telephone unit, an electronic game machine and the like electronic apparatus which incorporate the electro-acoustic transducer.

BACKGROUND ART

A conventional electro-acoustic transducer (hereinafter referred to as transducer) is described referring to FIG. 8 through FIG. 13. FIG. 8 through FIG. 10 show cross sectional views of conventional transducer working as the speaker, or as the receiver, in a portable telephone unit or the like electronic apparatus. As shown in FIG. 8, magnet 1 is disposed between upper plate 2 and yoke 3 constituting an inner-magnet type magnetic circuit 4. Yoke 3 of magnetic circuit 4 is press-fit in resin frame 6, and integrated by gluing. Diaphragm 7 is fixed to frame 6 at the circumference. Voice coil 8, which is for vibrating diaphragm 7, is attached to diaphragm 7, at the same time it is placed in magnetic gap 5 of magnetic circuit 4.

Lead wire of voice coil 8 is soldered with one end of terminal 10. Frame 6 is provided with terminal 10, which is molded partially in the frame. Terminal 10 is bent-up at its approximate middle into two portions so that it is not stretching out beyond the outer boundary of frame 6. The other end of terminal 10 is designed to work as the electrical terminal to be coupled with a system of an apparatus. Terminal 10 is formed by bending a conductive sheet metal, and makes contact with an electric supply section of a system taking advantage of the spring force of sheet metal. One end of terminal 10's sheet metal is folded inward to constitute stopper 9; which stopper is expected to restrict terminal 10 not to be bent beyond the reversibility limit value of the metallic material.

FIG. 9 and FIG. 10 are cross sectional views, showing terminal 10 of FIG. 8 at its different states. Assuming that FIG. 8 shows terminal 10 at its top dead point, FIG. 9 illustrates terminal 10 at its bottom dead point. FIG. 10 shows a state of terminal 10 where it is undergoing too much force which was given further after terminal 10 reached the bottom dead point, and stopper 9 was deformed and collapsed.

FIG. 11 and FIG. 12 are cross sectional views, showing the above-described transducer being assembled in a portable telephone unit or the like electronic apparatus. FIG. 11 shows a state where terminal 10 is moderately bent, and the telephone unit's electric supply section is kept pressed with an appropriate spring force. FIG. 12 shows a state when a portable telephone unit is dropped, for example. Due to the impulsive force, which was caused as the result of an external factor, terminal 10 was pushed by the telephone unit's electric supply section and bent to reach the bottom dead point, furthermore, an excessive force was additionally given to, and stopper 9 was deformed and collapsed. In the illustrated case, the bent sections of stopper 9 and terminal 10 were deformed beyond the reversibility limit value of the metallic material. So, once it is hit by such a shock force, it is difficult for them to return to their original states even after the force is withdrawn.

A transducer of the above-described structure has been disclosed in Japanese Patent Unexamined Publication No. 2003-37890.

Portable telephone units or the like electronic apparatus containing the above transducer sometimes have to undergo rough handling of users; these apparatus can be treated roughly, even dropped to the ground and damaged. Therefore, there has been a strong voice from the market for an enhanced reliability with these kinds of electronic apparatus. In order to raise the reliability with apparatus, it is indispensable to enhance the reliability of a transducer incorporated in apparatus.

In the conventional transducers, or the speakers, receivers, their connection with electrical supply section of a system relies upon the spring force of sheet metal constituting terminal 10. However, in a case where much dimensional margins are provided for assembling a speaker into an apparatus body, stopper 9 of terminal 10 might get deformed when a speaker is pushed in an apparatus body during assembly; then, terminal 10 can be bent beyond the reversibility limit value of the spring force of the metallic material. Or, when a portable telephone unit or other such electronic apparatus is dropped by careless handling, stopper 9 of terminal 10 may be collapsed by a substantial impulsive force, and terminal 10 may sometimes be bent beyond the reversibility limit value of the spring force of the metallic material. Although stopper 9, which is formed of the same metallic material, is provided with a spring force, it can also be deformed permanently when a strong force is applied exceeding the reversibility limit value. This is the mechanism how the above-described problem arises. Then, the respective spring forces of terminal 10 and stopper 9 deteriorate; as the result, the contact with electrical supply section of an apparatus becomes instable. Problem will appear under such a situation; signal transfer can be readily interrupted due to contact error whenever an apparatus is hit by an impulsive force or it is exposed to vibrating motion. This is not a problem peculiar to the above-described configuration where stopper 9 is formed at the end portion of terminal 10, but the same problem may arise in the other configuration illustrated in FIG. 13, where stopper 11 is formed integrally with the same resin when a frame is molded through injection. In the latter configuration, once resin stopper 11 is damaged by an impulsive force, terminal 10 is bent beyond the reversibility limit value of the spring force of the metallic material.

SUMMARY OF THE INVENTION

An electro-acoustic transducer in the present invention comprises a magnetic circuit, a frame, a diaphragm, a voice coil, a terminal and a stopper. The frame is coupled with magnetic circuit. The diaphragm is fixed to the frame at the circumference. The voice coil is attached to the diaphragm, and disposed in part in the magnetic circuit's magnetic gap. The terminal is consisting of a metallic material having spring property and electrical conductivity, and electrically connected with the voice coil.

The stopper is formed of an elastic body or a rigid body disposed on the reverse surface of the magnetic circuit. The stopper restricts the bending of terminal to be within the reversibility limit value of the metallic material. Thus the stopper functions to prevent the terminal from being deformed, without the stopper itself being deformed or collapsed.

The present invention also offers an electronic apparatus which incorporates the electro-acoustic transducer.

DETAILED DESCRIPTION OF PREFERRED EMBODIMENTS

Figure 1:
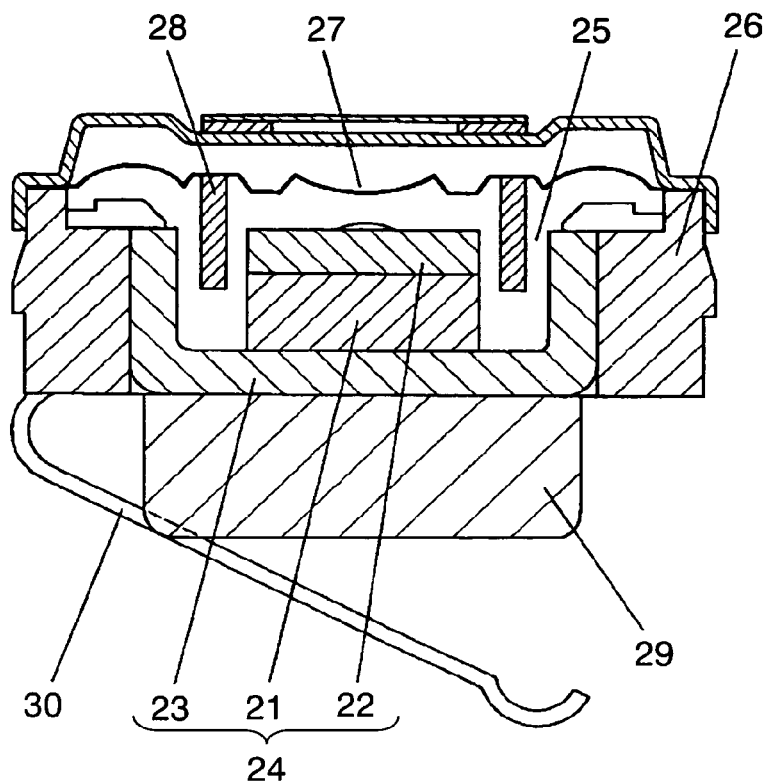
FIG. 1 is a cross sectional view of a speaker in accordance with an exemplary embodiment of the present invention.

The stopper of a transducer in accordance with the present invention is enhanced so that a sheet metal is not bent beyond the reversibility limit value of the metallic material. Namely, the stopper is formed of a material that can withstand an impulsive force. The stopper is formed using either an elastic body having an impulsive-force resistance and an excellent resilience or a rigid body, and the stopper thus formed is disposed on the reverse surface of magnetic circuit's yoke or bottom plate which is also an impulsive-force withstanding body made of metal material. Under this configuration, where a stopper formed of an elastic body or a rigid body has an excellent resilience and it is disposed on the reverse surface of magnetic circuit made of a metallic material, the stopper demonstrates a superior impulsive-force resistance. As the result, the stopper works to prevent a terminal from being deformed, without the stopper itself deformed or collapsed. Namely, even if a terminal is exposed to an excessive impulsive force, for example when a speaker, or transducer, is pushed strong for assembly into the case of a apparatus which is provided with much dimensional margin for the push-in operation, or in a case when a portable telephone unit or other such electronic apparatus is dropped by careless handling, the stopper will never get deformed or collapsed. So, a terminal will never be bent beyond the reversibility limit value of the metallic material, and the spring force of a terminal will not deteriorate. Thus a terminal can keep providing a substantial spring force. Consequently, a terminal and an electric supply section of electronic apparatus can enjoy a stable mutual contact; and the stability of which contact is not ill-affected even when an electronic apparatus is hit by an impulsive force or vibrated. The contact problems hardly arise, and a stable signal transfer is not interrupted. As the results, the reliability of a portable telephone unit or the like electronic apparatus which contains a transducer in accordance with the present invention is enhanced.

Now in the following, exemplary embodiments of the present invention are described more in detail referring to the drawings. It should be noted that the drawings are provided for describing the concept of invention; they do not necessarily exhibit the relative positioning among components with dimensional accuracy.

As to the bottom area of a stopper in the present invention, it may be determined at a designer's option in so far as it is smaller than the magnetic circuit's yoke or the bottom plate on which the stopper is disposed. As to the height of a stopper, it is generally determined at somewhere approximately the same level as the terminal's spring force operating point.

First Example Embodiment

Figure 2:
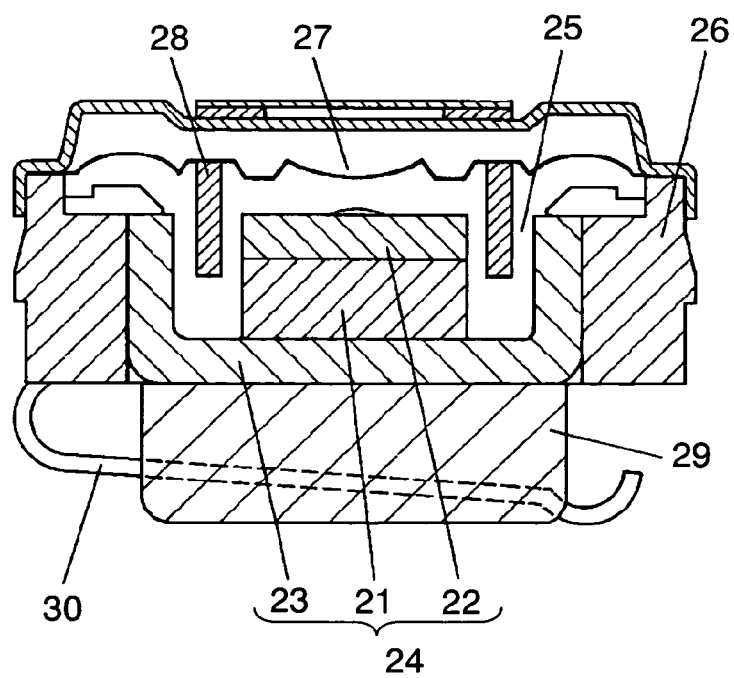
FIG. 2 is a cross sectional view of a speaker in accordance with an exemplary embodiment of the present invention.
Figure 3:
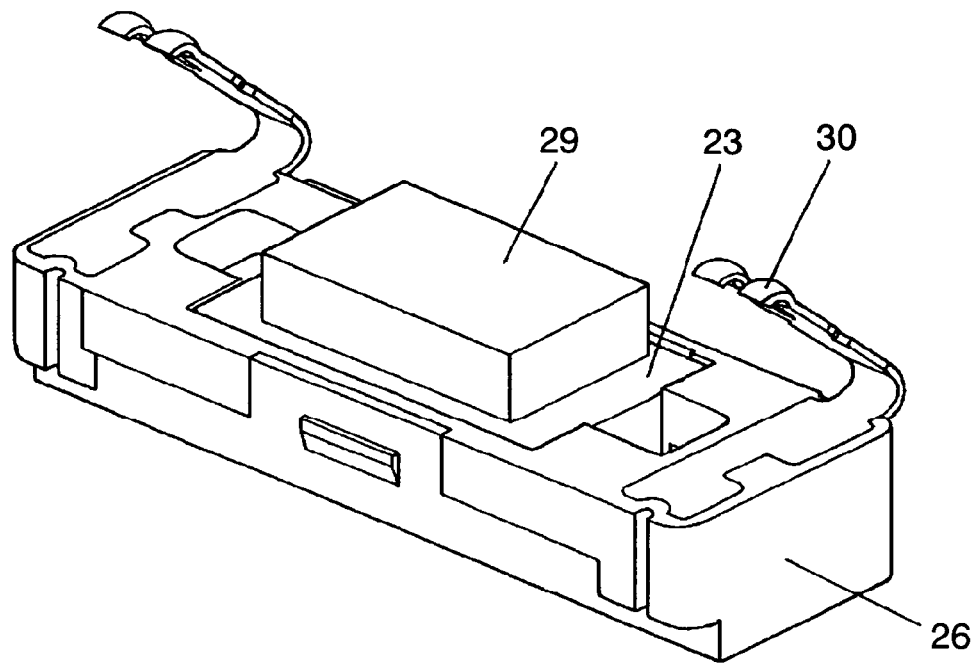
FIG. 3 is a perspective view of a speaker in accordance with an exemplary embodiment of the present invention.

A speaker, or the transducer in accordance with an exemplary embodiment of the present invention, is described referring to FIG. 1 through FIG. 3. Although the speaker described in the present embodiment has a square-shape and a slim contour, it is not the intention of the present invention to limit the speaker type as such.

FIG. 1 is a cross sectional view of a speaker in accordance with a first embodiment of the present invention. FIG. 2 shows a cross sectional view of the speaker of FIG. 1, with the terminal at its bottom dead point under the protection of a stopper. FIG. 3 is a perspective view showing the speaker of FIG. 1 as observed from a different viewing point. As shown in FIG. 1 through FIG. 3, inner-magnet type magnetic circuit 24 is formed of magnetized magnet 21 sandwiched by upper plate 22 and yoke 23. Magnetic circuit 24 is press-fit to resin-made frame 26, keeping the contact of yoke 23 with the frame. The frame has already been provided with terminal 30 with a part of it molded therein. The magnetic circuit and the frame are integrated together using an adhesive agent.

Diaphragm 27 is glued to frame 26 at the circumferential edge, while voice coil 28 attached to diaphragm 27 for vibrating it is disposed to be fitting in magnetic gap 25. A lead wire of voice coil 28 is soldered at one end of terminal 30.

As the final step, terminal 30 is bent up at its approximate middle part into two portions so that terminal 30 is not stretching beyond the overall outer dimensions of frame 26. The other end of terminal 30 shaped into a certain specific form is supposed to work as an electrical terminal for connection with a system built in an apparatus. Terminal 30 is coupled with stopper 29 formed of either an elastic body or a rigid body and disposed on the reverse surface of magnetic circuit 24's yoke 23. Stopper 29 is for restricting the bending of terminal 30 to be within the reversibility limit value of the metallic material. Stopper 29 of an elastic body is formed of polymer materials. At least one selected from among the group of rubber, elastomer, urethane foam and foamed resin is used for the polymer material. The reason why such material is used is that it absorbs excessive force generated as the result of dropped apparatus to protect a speaker, and that it can survive a number of dropped shocks because of its substantial restoring force. The polymer materials can be either organic compounds or inorganic ones. Furthermore, since the above-described polymer materials have the insulating property, they are advantageous also with respect to the following aspect: Terminal 30 and stopper 29 seldom make direct contact in the normal situation. However, we can not totally deny a possibility of an extraordinary impulsive force which would deform two of terminal 30 and bring them into contact with stopper 29. Even in such an incident, a short-circuit trouble will never arise with stopper 29 which has an insulating property.

Instead, stopper 29 may be structured of a rigid body. Either an organic material or a non-magnetic material may be used for the rigid body. Preferred organic material is that which is used for the resin frame. Some of the names of practical materials include; polyphthalamide, PBT, PS, ABS, PP, etc. Preferred non-magnetic metal materials include; aluminum, copper, stainless steel, titanium, etc. Although stopper 29 consisting of a single body has been used in the foregoing descriptions, it can be a composite body consisting of the above-described elastic body and rigid body. For the connection of stopper 29 and the magnetic circuit's yoke, or lower plate, an appropriate adhesive agent may be used taking into consideration the property of materials used for the constituent parts.

Terminal 30 in the above-described configuration is moderately bent when a speaker is assembled in an electronic apparatus, and the terminal keeps on providing an appropriate spring force onto the electric supply section of the apparatus. Even if a speaker is pushed too much into the apparatus body on an assembly line, stopper 29 blocks the pushing force to protect terminal 30, not allowing the terminal to be bent any further.

In a case when a portable telephone unit or the like electronic apparatus is dropped by careless handling and terminal 30 is hit by an excessive force, stopper 30 protects terminal 30 from being deformed beyond the reversibility limit value of the metallic material, thus it can stay intact. Terminal 30 is not bent beyond the reversibility limit value of the spring force of the metallic material, so the spring force of terminal 30 does not decrease. Consequently, it keeps on providing a sufficiently high spring force, and the stable contact with an electronic apparatus' electric supply section is maintained. Even if an electronic apparatus is hit by an impulsive force or vibrated, contact trouble does not arise and the stability of signal transfer is interrupted. The reliability of portable telephone unit and the like electronic apparatus is thus enhanced. As to the material of the sheet metal, those rich in the spring property and the electrical conductivity are preferred; phosphor bronze, an alloy of copper and titanium are among them. The reversibility limit value of a metallic material is subject to such items as the angle of bending, the shape of bent portion and the intensity of a load and the repetition times of such loads.

Second Example Embodiment

Figure 4:
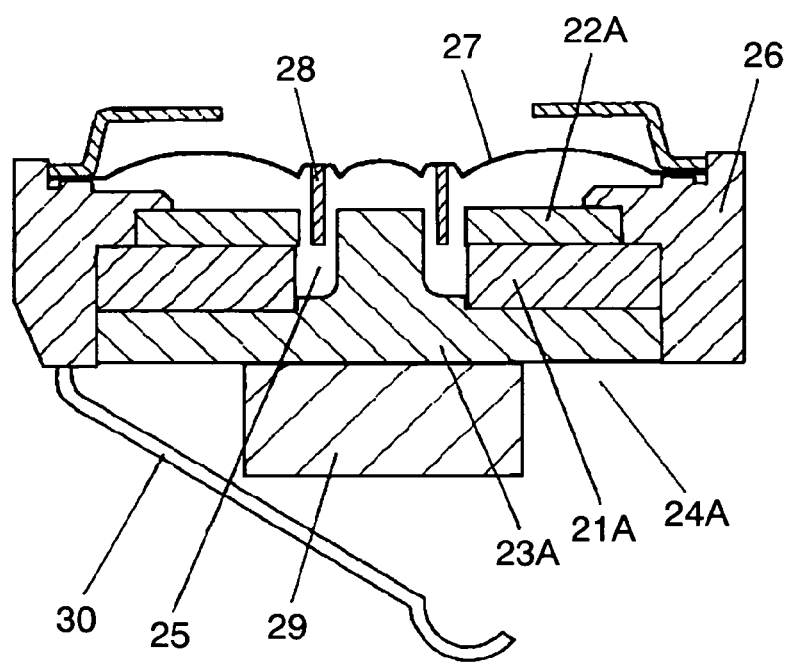
FIG. 4 is a cross sectional view of a speaker in accordance with an exemplary embodiment of the present invention.

FIG. 4 is a cross sectional view of a speaker in accordance with an exemplary embodiment of the present invention. Only the point of difference from the first embodiment is described in the following. Magnetized magnet 21A is disposed between upper plate 22A and lower plate 23A to constitute an outer-magnet type magnetic circuit 24A. Stopper 29 formed of an elastic body or a rigid body is disposed on the reverse surface of outer-magnet type magnetic circuit 24A's lower plate 23A. The stopper restricts bending of terminal 30. As the present embodiment indicates, a countermeasure for terminal 30 from the permanent deformation can be implemented also with an electro-acoustic transducer of outer-magnet type magnetic circuit, besides that of inner-magnet type magnetic circuit. Thus the present invention offers an advantage of enhancing the reliability of portable telephone units and other such electronic apparatus. Those materials exemplified in the first embodiment may of course be used for stopper 29 of the present embodiment.

Third Example Embodiment

Figure 5:
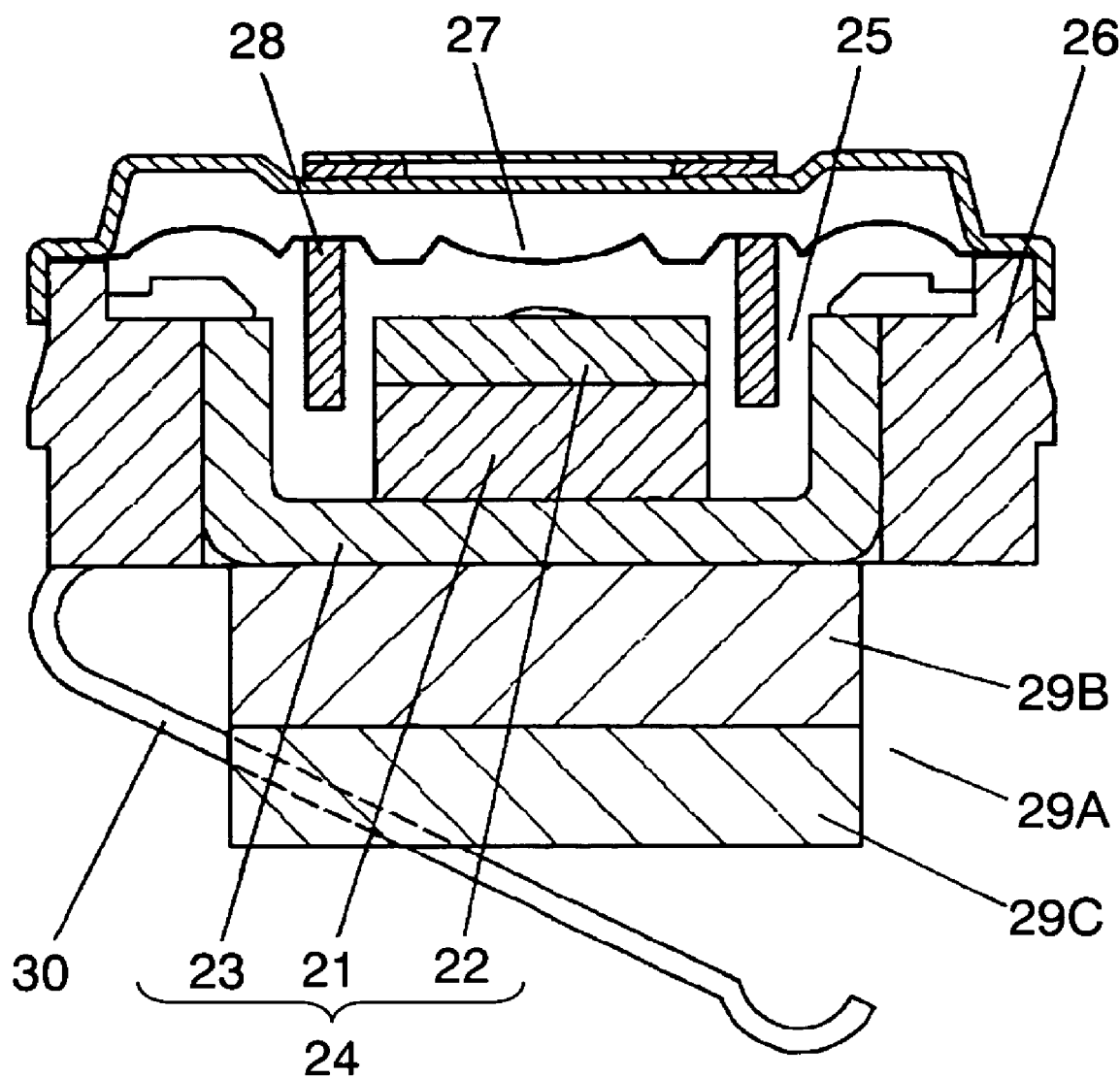
FIG. 5 is a cross sectional view of a speaker in accordance with an exemplary embodiment of the present invention.

Third embodiment is described with reference to FIG. 5. FIG. 5 is a cross sectional view of a speaker in accordance with an exemplary embodiment of the present invention. A rectangular speaker having a slim contour is shown in the drawing, like in the case of first embodiment. Only the point of difference from the first embodiment is described in the following.

As shown in FIG. 5, stopper 29A is a laminated body consisting of at least two kinds of materials each having different coefficient of elasticity. The stopper is for restricting the bent range.

Stopper 29A is constituted by first gluing rubber 29B, which is a polymer material having a relatively low elasticity coefficient or a hard material, direct on the reverse surface of magnetic circuit 24's yoke 23. And then urethane foam 29C which is a soft material having the higher elasticity coefficient is glued direct onto rubber 29B. Stopper 29A thus constituted works as follows: Urethane foam, which is the softer staff, absorbs an impulsive force generated when an apparatus is dropped, while rubber, which is the harder staff, works as stopping member. These staffs integrally function to protect terminal 30 from being deformed. In other words, stopper 29A plays two kinds of different roles, viz. absorption of the shock and prevention of terminal 30's permanent deformation, for further enhancing the reliability of portable telephone units and the like electronic apparatus. Rubber 29B in the present context is referred to as hard material, it is because the coefficient of elasticity is lower than that of urethane foam 29C. The present embodiment describes a laminar stopper 29 which is consisting of at least two kinds of materials each having different coefficient of elasticity. It exemplifies rubber 29B and urethane foam 29C as the two polymer materials each having different coefficient of elasticity. However, it is not the intention of the present invention to limit the structure of stopper as such. Instead, a rigid body and an elastic body may be combined for forming a laminar body.

Furthermore, the sequence of rubber 29B and urethane foam 29C to be glued on the reverse surface of magnetic circuit 24 may be reversed.

Fourth Example Embodiment

Figure 6:
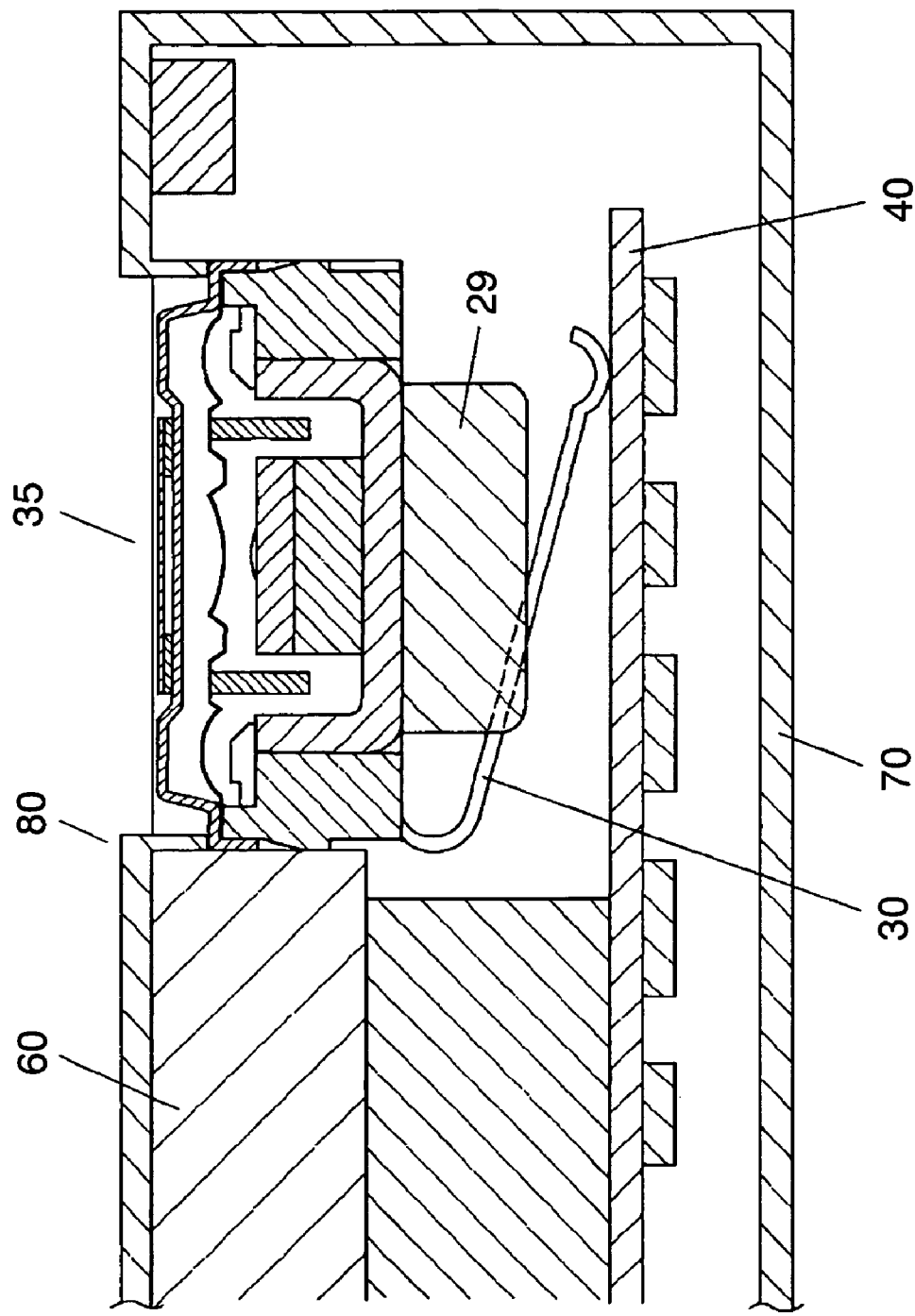
FIG. 6 is a cross sectional view in part of an electronic apparatus in accordance with an exemplary embodiment of the present invention.
Figure 7:
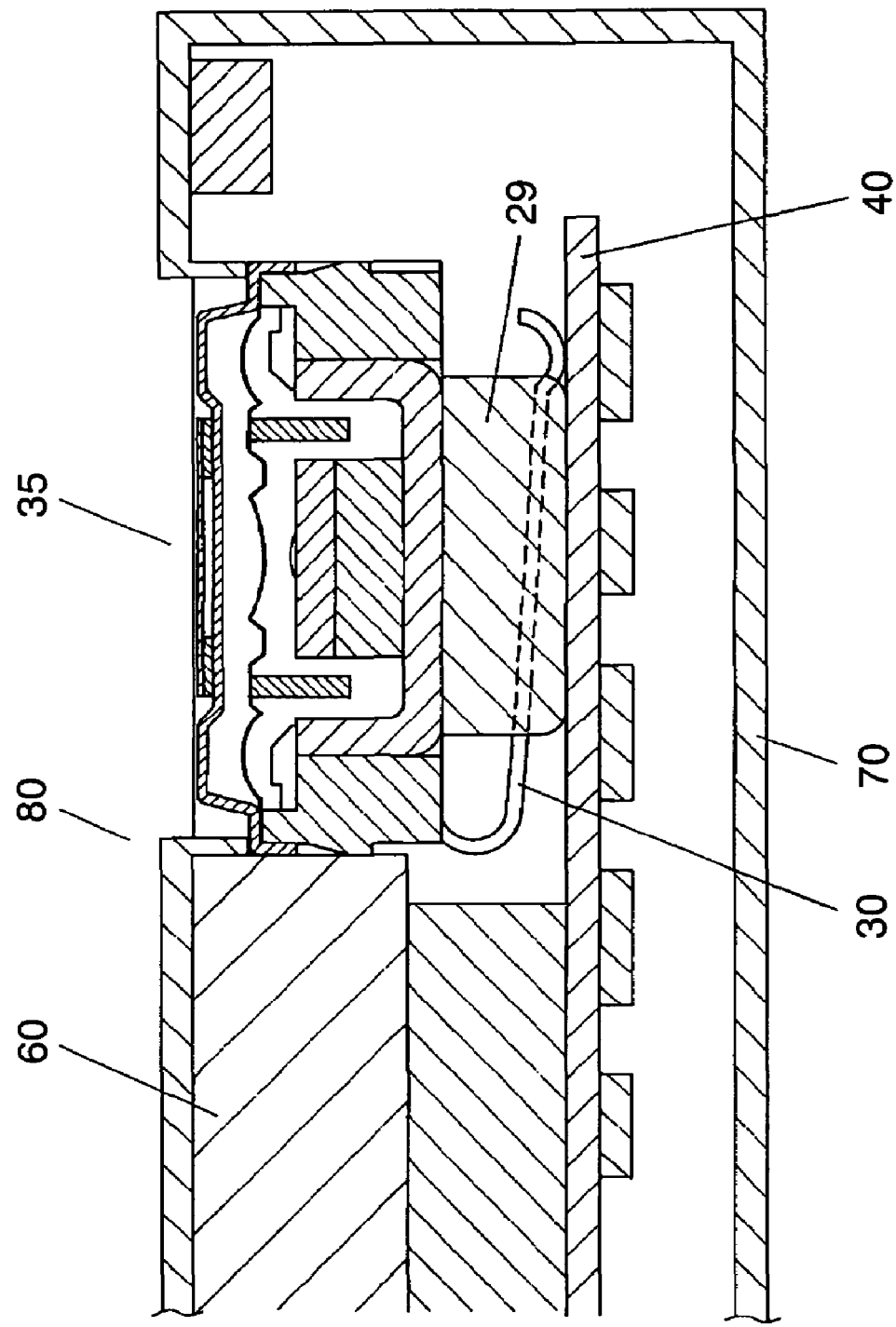
FIG. 7 is a cross sectional view in part of an electronic apparatus in accordance with an exemplary embodiment of the present invention.
Figure 8:
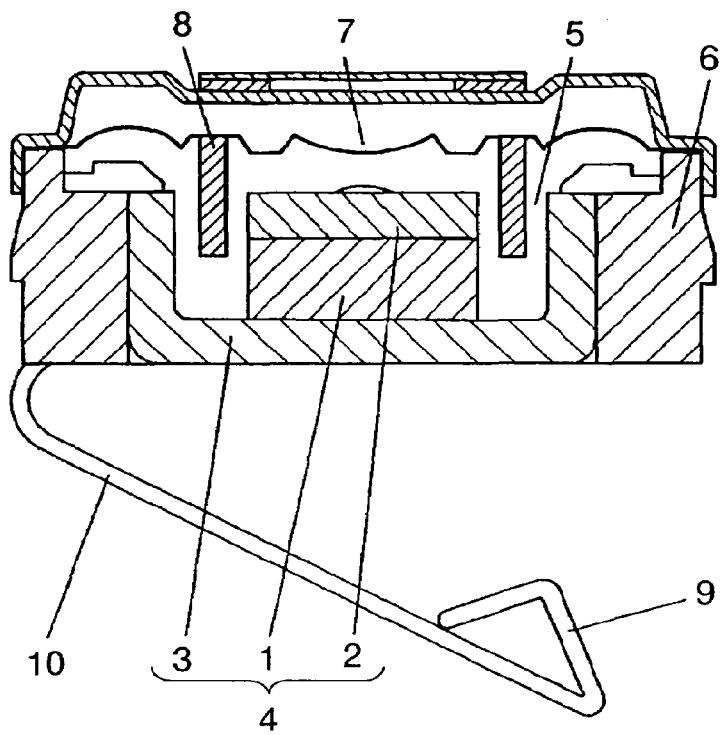
FIG. 8 is a cross sectional view of a conventional speaker.
Figure 9:
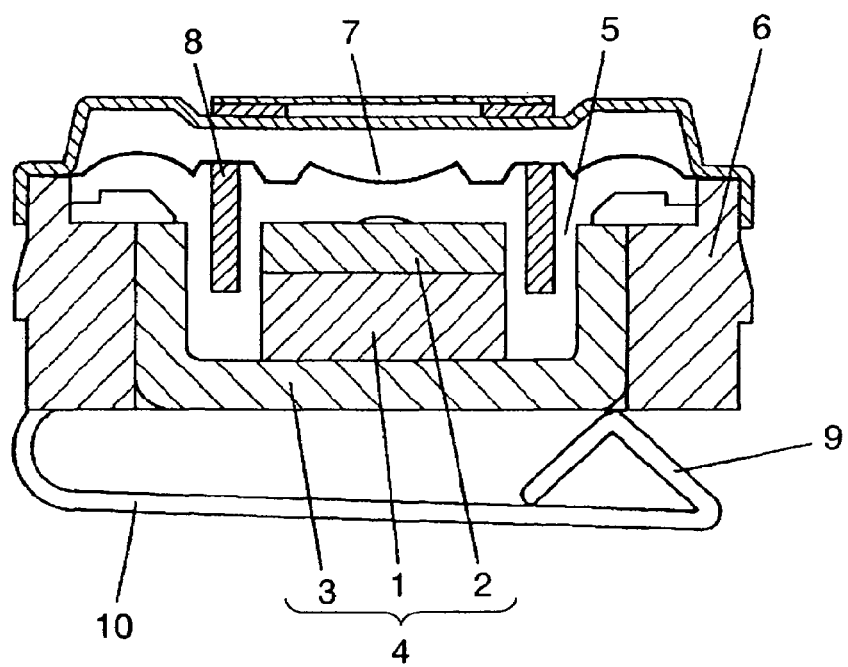
FIG. 9 is a cross sectional view of a conventional speaker.
Figure 10:
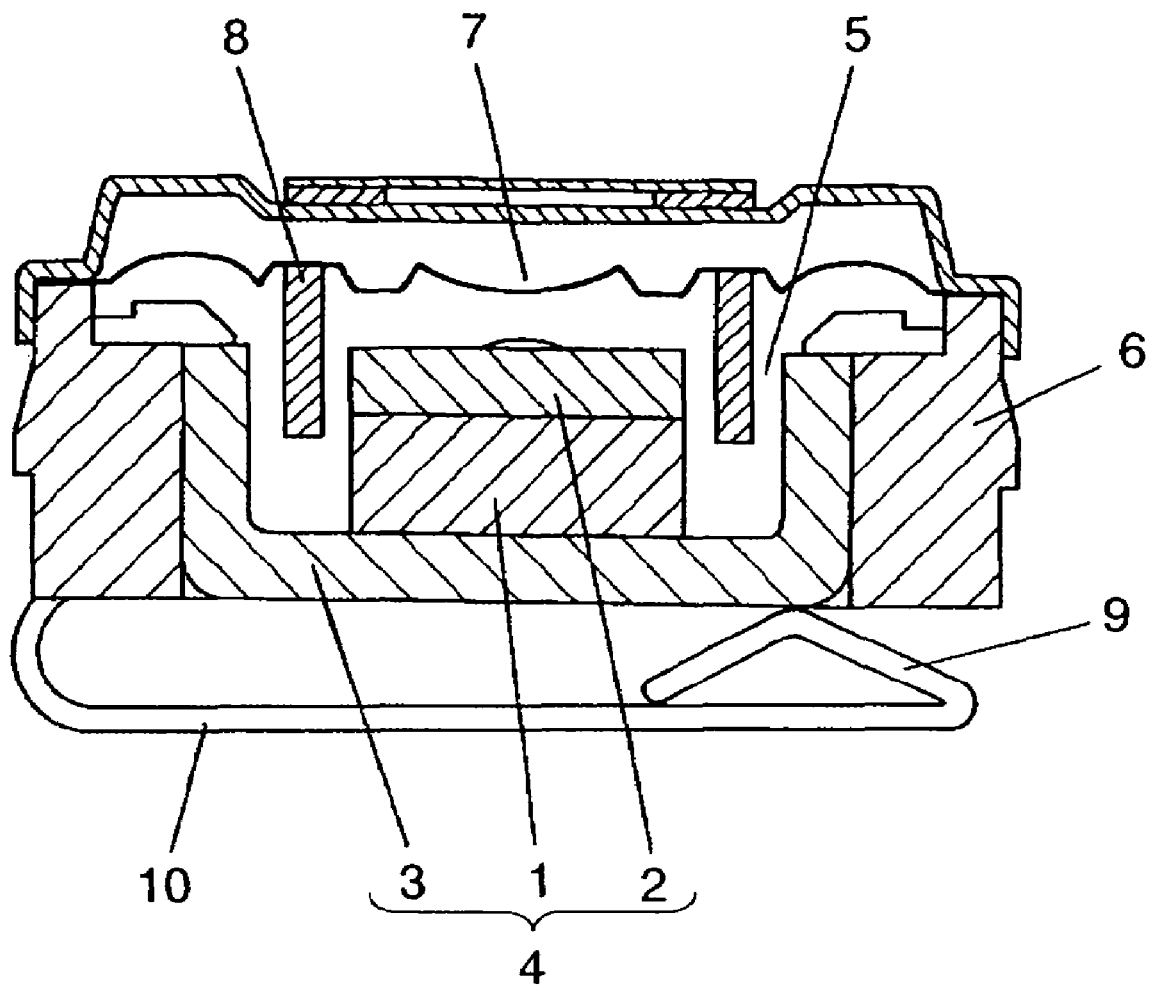
FIG. 10 is a cross sectional view of a conventional speaker.
Figure 11:
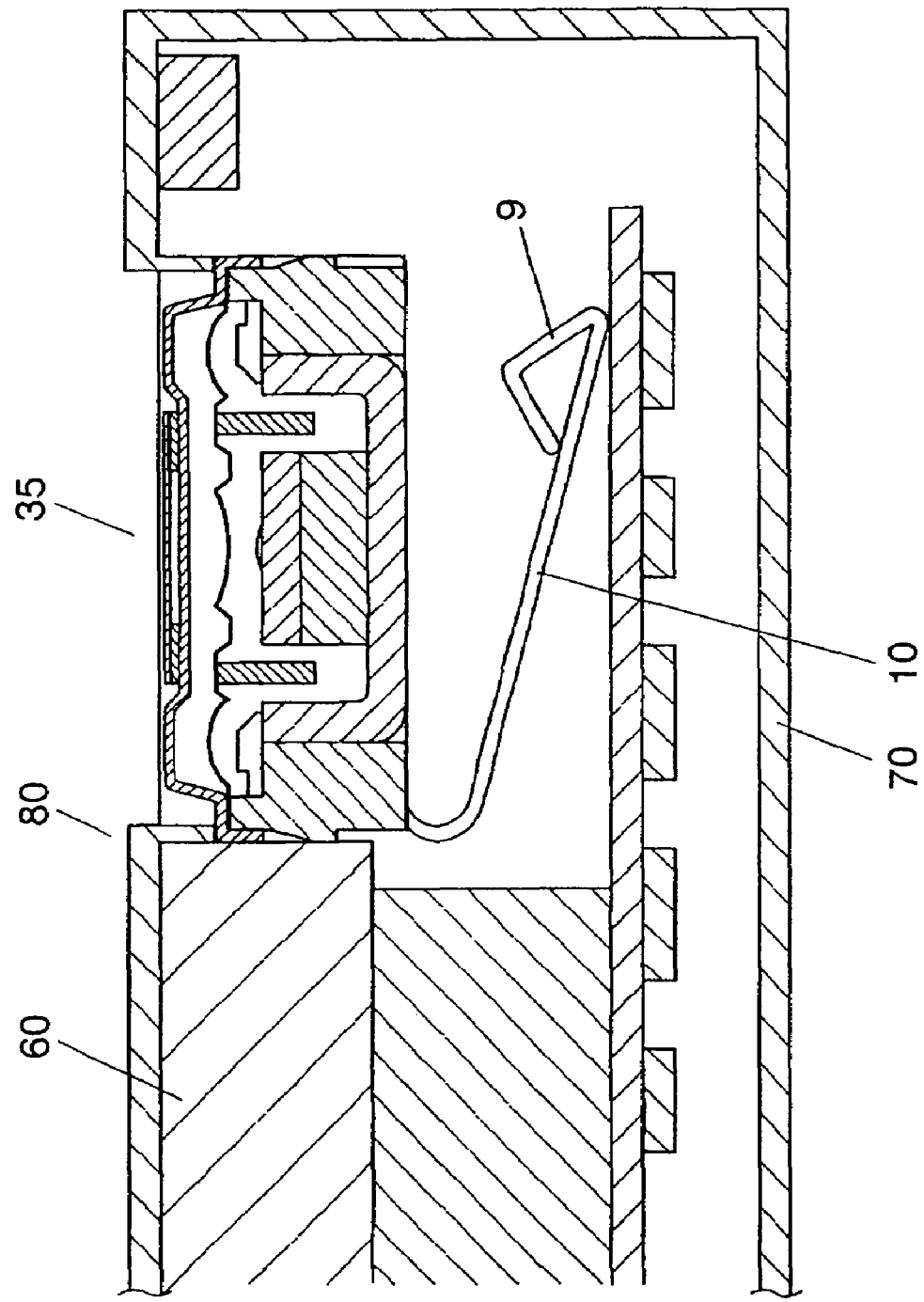
FIG. 11 is a cross sectional view in part of a conventional electronic apparatus.
Figure 12:
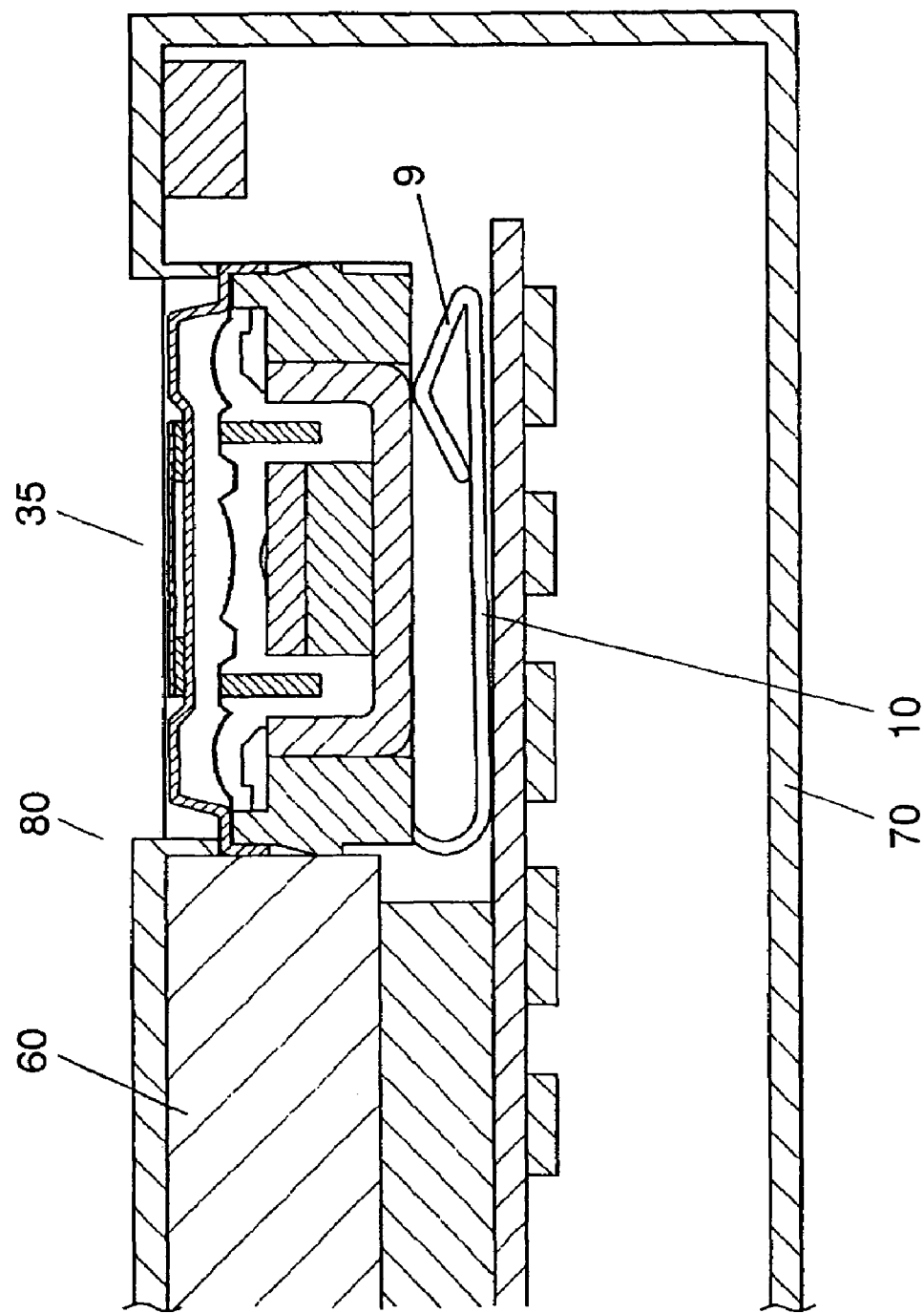
FIG. 12 is a cross sectional view in part of a conventional electronic apparatus.
Figure 13:
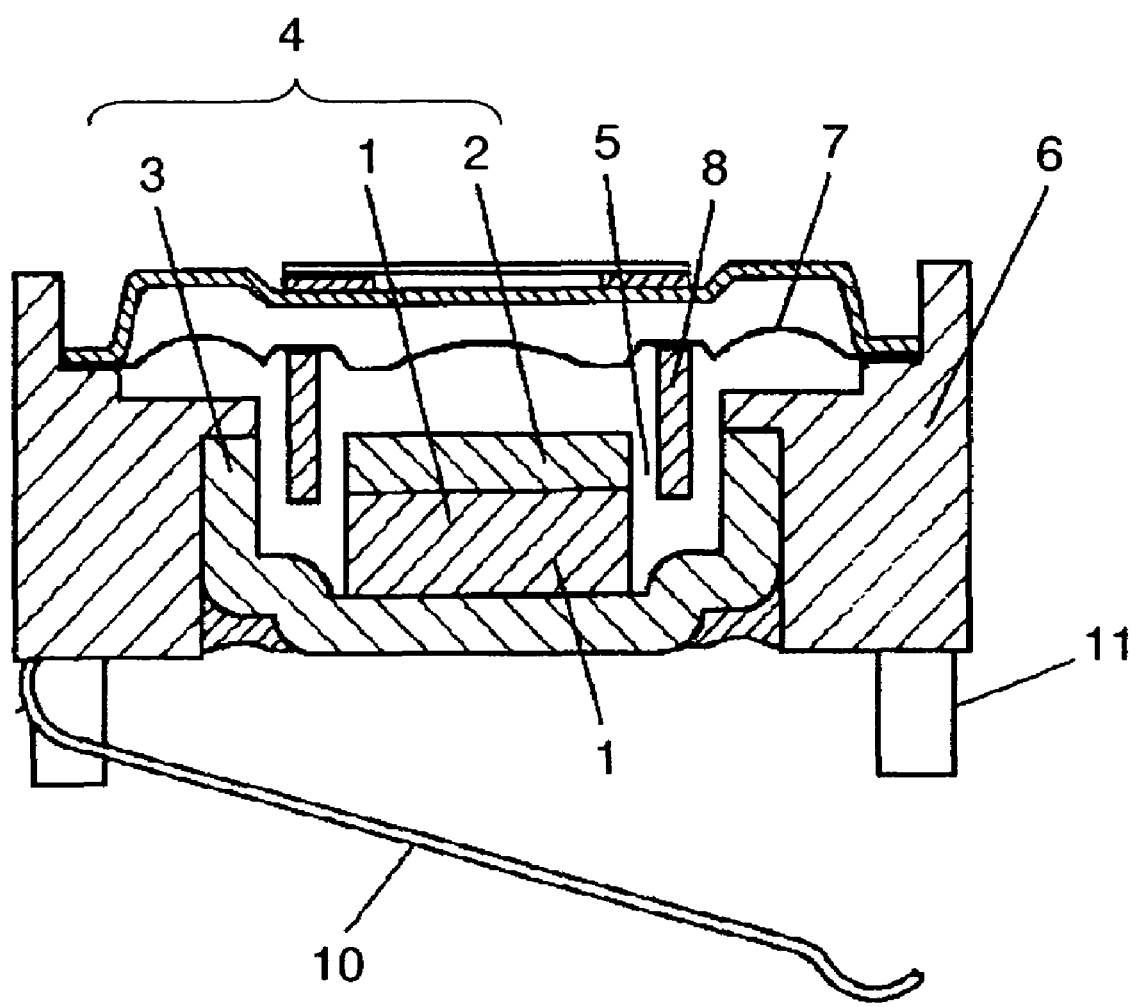
FIG. 13 is a cross sectional view of a conventional speaker.

FIG. 6 and FIG. 7 are cross sectional views showing in part of a portable telephone unit, or an electronic apparatus, which is an exemplary embodiment of the present invention. Fourth embodiment is described referring to these drawings. Portable telephone unit 80 is mounted with speaker 35. Although speaker 35 illustrated in the drawing has an inner-magnet type magnetic circuit, the speaker can be an outer-magnet type.

FIG. 6 shows key part of portable telephone unit 80, which key part includes speaker 35, electronic circuit 40, display module (LCD panel, or the like) 60, etc. mounted in the inside of outer case 70. Taking advantage of the spring force, terminal 30 of speaker 35 establishes an electrical contact with electronic circuit 40, in order to receive electricity for driving the speaker.

Under the above-described configuration, even if terminal 30 is exposed to an excessive force as shown in FIG. 7, for example when speaker 35 is pushed into portable telephone unit 80's case which has been designed with much margin for the push-in dimensions, or in a case when portable telephone unit 80 is dropped by careless handling, stopper 29 works not to cause a permanent deformation, or a collapse, on terminal 30. In other words, terminal 30 will never be bent beyond the reversibility limit value of the spring force of the metallic material; so, there will be no decrease in the spring force of terminal 30. Terminal 30 can keep providing a substantial spring force. Thus, terminal 30 and portable telephone unit 80's electronic circuit 40 can enjoy a stable mutual contact, and the stable contact is not ill-affected even when portable telephone unit 80 is hit by an impulsive force or vibrated. A stable signal transfer is not interrupted. As the results, the reliability of portable telephone units and the like electronic apparatus can be enhanced, and the quality level improved. Stopper 29 in the present embodiment can be formed with the same materials used in the foregoing embodiments.

Since the stoppers in accordance with the present invention absorb the impact caused by dropping, etc. through the surface contact, they effectively protect the terminals from being deformed permanently.

Magnets used in the present invention should preferably be those having a high energy product. Examples of such magnet include; neodymium system magnet, samarium-cobalt system magnet, etc.

INDUSTRIAL APPLICABILITY

Electro-acoustic transducers in accordance with the present invention are suitable for use in various kinds of electronic apparatus, such as audio-visual equipment, information communication device, game machine, etc. which are requested to have an enhanced reliability and an improved quality.

The invention claimed is:

1. An electro-acoustic transducer comprising a magnetic circuit,
   a frame coupled with the magnetic circuit,
   a diaphragm fixed to the frame at the circumference,
   a voice coil attached to the diaphragm and disposed in part in the magnetic gap of magnetic circuit,
   a terminal consisting of a sheet metal having spring property and electrical conductivity, electrically coupled with the voice coil, and
   a stopper formed of an elastic body made of polymer material bonded with an adhesive to a reverse surface of the magnetic circuit for restricting the bending of the sheet metal constituting the terminal to be within the reversibility limit value of the metallic material.

2. The electro-acoustic transducer of claim 1, wherein the stopper is disposed on the reverse surface of the magnetic circuit's yoke.

3. The electro-acoustic transducer of claim 1, wherein the stopper is disposed on the reverse surface of the magnetic circuit's lower plate.

4. The electro-acoustic transducer of claim 1, wherein the polymer material is at least one selected from among the group consisting of rubber, elastomer, urethane foam and foamed resin.

5. An electro-acoustic transducer comprising a magnetic circuit,
   a frame coupled with the magnetic circuit,
   a diaphragm fixed to the frame at the circumference,
   a voice coil attached to the diaphragm and disposed in part in the magnetic gap of magnetic circuit,
   a terminal consisting of a sheet metal having spring property and electrical conductivity, electrically coupled with the voice coil, and
   a stopper bonded with an adhesive to a reverse surface of the magnetic circuit for restricting the bending of the sheet metal constituting the terminal to be within the reversibility limit value of the metallic material wherein the stopper is formed of a laminar body which is made of at least two kinds of materials each having different coefficient of elasticity.

6. An electronic apparatus containing an electro-acoustic transducer, the transducer comprising:
   a magnetic circuit,
   a frame coupled with the magnetic circuit,
   a diaphragm fixed to the frame at the circumference,
   a voice coil attached to the diaphragm and disposed in part in the magnetic gap of magnetic circuit,
   a terminal consisting of a sheet metal having spring property and electrical conductivity, electrically coupled with the voice coil, and
   a stopper formed of an elastic body made of polymer material bonded with an adhesive to a reverse surface of the magnetic circuit for restricting the bending of the sheet metal constituting the terminal to be within the reversibility limit value of the metallic material.

7. An electronic apparatus according to claim 6, wherein the stopper is disposed on the reverse surface of the magnetic circuit's yoke.

8. An electronic apparatus according to claim 6, wherein the stopper is disposed on the reverse surface of the magnetic circuit's lower plate.

* * * * *